United States Patent

[11] 3,633,270

[72] Inventor  Bagdasar Deradoorian
              Detroit, Mich.
[21] Appl. No. 860,346
[22] Filed     Sept. 23, 1969
[45] Patented  Jan. 11, 1972
[73] Assignee  The United States of America as
               represented by the Secretary of the Air
               Force

[54] ANODE ARRAY TECHNIQUES
     4 Claims, 4 Drawing Figs.

[52] U.S. Cl. .................................. 29/592 R,
     29/419 R, 29/25.18 R, 65/59 R, 156/89 R, 312/95 R
[51] Int. Cl. .................................. B33p 17/00
[50] Field of Search .......................... 29/419,
                    592, 25, 18; 313/95; 65/59; 156/89

[56]              References Cited
              UNITED STATES PATENTS
2,608,722  9/1952  Stuetzer ...................... 29/592
3,206,831  9/1965  Strother ...................... 29/572
3,319,318  5/1967  Taimuty ....................... 29/592
3,204,326  9/1965  Granitsas ..................... 29/419 X
3,562,894  2/1971  Rome .......................... 29/412

Primary Examiner—John F. Campbell
Assistant Examiner—Robert W. Church
Attorneys—Harry A. Herbert, Jr. and Ruth G. Codier ABSTRACT: A multianode array is formed by prefusing thin sheaths of glass to Kovar rods and stacking the sheathed rods together with glass cane. The structure is then fused to form a continuous matrix by processing under high temperature and pneumatic pressure to form a solid billet from which anode stems are sliced for use with photomultipliers and other varied components.

PATENTED JAN 11 1972

3,633,270

INVENTOR.
BAGDASAR DERADOORIAN

BY Harry A. Herbert, Jr.
and
Ruth Coolier
ATTORNEYS

ANODE ARRAY TECHNIQUES

BACKGROUND OF THE INVENTION

This invention relates to anode array techniques and more particularly to the formation of anode bundles from which anode stems may be sliced.

There are a number of applications where it would be highly desirable to use a matrix photomultiplier tube having a multianode array element therein. For instance, in laser radar tracking a matrix detector will provide both range and azimuth information and it will also divide signal-obscuring background radiation associated with a large total sensitive area down to a small amount of background radiation in each detector.

Another quite different type of situation arises in extracting all the information inherently available from an image being observed with an astronomical telescope. It is well known that in practice the detail obtained from such images is limited not by diffraction but by atmospheric turbulence. Since photographic emulsions lack sensitivity, they integrate the atmospheric turbulence over sustained periods of time which blurs the image. However, a matrix photomultiplier is highly sensitive; and if the signals at all anodes are recorded, it is possible by subsequent signal processing to compensate for the turbulence using image reconstruction techniques.

A matrix photomultiplier is also analogous to a highly sensitive eye in the sense that visible images are converted into a large number of parallel electrical signals. The time is approaching when integrated circuit techniques will be sufficiently advanced to permit sophisticated pattern recognition using electronic logic circuits to simulate nervous systems.

The problem is to provide within a single envelope many individual photomultipliers, each of which operate independently with a minimum of cross-coupling. At the same time, the high sensitivity aNd wide bandwidth characteristics of photomultipliers must be preserved.

From the above, it is clear that the key to the design of a matrix photomultiplier is an electron multiplier element capable of high spatial resolution, high gain, fast response, and simple construction. This requires the inclusion of a multianode stem which maintains vacuum integrity and is compatible with phototube materials and processes.

SUMMARY OF THE INVENTION

In response to the needs noted above, a process was evolved wherein anodes are arranged in a parallel array, as for example in a 10 ×10 geometric formation, using glass tubing and cane in the interstitial areas, and compacting at a sufficiently high temperature with pneumatic pressure to fuse the discrete parts into a solid matrix containing, in the 10 ×10 array, a hundred separate and parallel anodes.

The object of the invention is, therefore, to provide a method of producing a multianode array for use in a photomultiplier tube element in laser radar detectors or the like wherein the array of anode elements are of the proper density to receive the information while being of specified center-to-center spacing and overall dimensions.

Another object of the invention is to provide a method of producing a multianode stem wherein a plurality of Kovar rods are positioned in a 10 ×10 array within a matrix of glass to form a billet from which a wafer is cut and polished.

A further object of the invention is the provision of a multianode stem wherein the cross-coupling capacitance between the elements is controllable to within the limits specified.

A still further object of the invention is to provide a multianode stem which maintains vacuum integrity after prolonged use in a matrix photomultiplier or the like.

Another still further object of the invention is to provide a method of fabricating a multianode stem which produces a finished product that is compatible with phototube materials and processes presently available.

These and other advantages, features and objects of the invention will become more apparent from the following description taken in connection with the illustrative embodiment in the accompanying drawing.

DESCRIPTION OF THE PREFERRED EMBODIMENT

Figure 2:
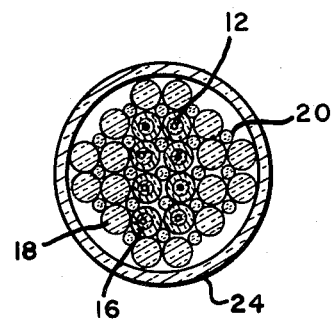
FIG. 2 is a cross section taken substantially on the line 2—2 of FIG. 1.
Figure 3:
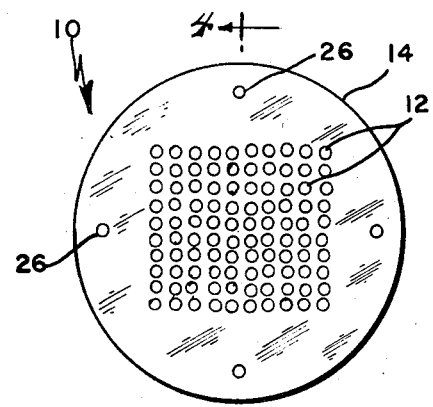
FIG. 3 is a view of a 10 ×10 anode stem arrangement.
Figure 1:
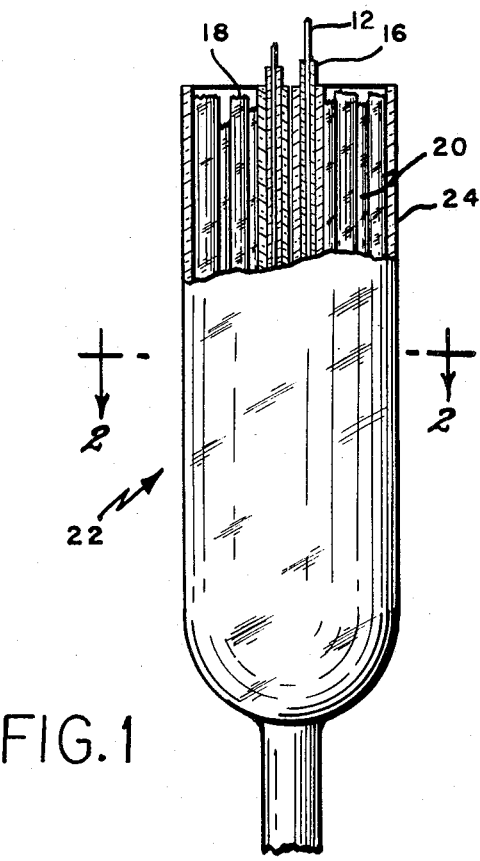
FIG. 1 is a view illustrating the steps involved in the process, and showing also one form of the billet.
Figure 4:
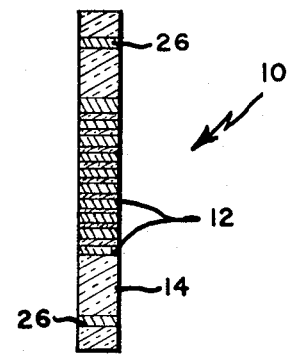
FIG. 4 is a section of an anode stem taken on the line 4—4 of FIG. 3.

The complete anode stem designated generally by the reference numeral 10 is shown in FIGS. 3 and 4 consists of 100 individual anodes 12 within a borosilicate glass matrix 14. The anodes are arrayed in a square geometry, 10 to a row.

The assembly and processing techniques that permitted the construction of this array are as follows:

In the process of developing a method which would realize the objectives as above stated, glass tubing 16 and glass cane rods 18 and 20 are stacked together into a matrix of approximately 1 -inch by 1 -inch format. The size of the glass cane was selected to fill the interstices and to provide the calculated spacing between the anode wires 12. Thereafter anode wires 12 of approximately 0.030-inch diameter, and which later formed the pins of the completed anodes, were threaded through the tubing 16. The billet 22 was formed by assembling the stacked matrix inside a glass tube 24 and vacuum fused by feeding slowly through an oven at approximate softening temperatures, and thereafter annealed. The fused and annealed billet was sliced into wafers and polished to produce the completed anode stem, an example of which is shown in FIGS. 3 and 4.

Outer leads 26 were supplied as necessary to provide the necessary external connections to the input and output of the multianode array 10.

In a subsequently developed process, Koval wire was used for the anode material 12. Before drawing the wire through the glass tubing 16, thin sheaths of glass were applied to the Kovar rods by a prefusing process. In this method also, the cane 18 and 20 and the sheathed Kovar rods were arranged to achieve a 10×10 array. The bundle thus formed was inserted into glass tube of Corning No. 7052 type. The bundle was then vacuum fused by feeding the anode matrix structure slowly through an oven where the separate glass rods, tubes and sheathing are fused into a solid matrix surrounding the Kovar rods. After annealing, the billet is sliced and polished as desired, and the completed anode stems shown in FIGS. 3 and 4 are obtained.

Although the invention has been described with reference to a particular embodiment it will be understood to those skilled in the art that the invention is capable of a variety of alternative embodiments within the spirit and scope of the appended claims.

I claim:

1. The method of producing a vacuumtight multianode stem structure for use in a photomultiplier component, said process comprising the steps of prefusing a thin sheath of glass around an anode wire, inserting the sheathed anode wire into a close-fitting glass tube, stacking said anode wire into an array with glass cane and tubing in the interstitials to form an anode matrix structure of a desired design, inserting the stacked anode matrix structure into a glass tube, vacuum fusing the anode matrix structure by feeding slowly through an oven at softening temperature to form a billet, annealing said billet, and slicing said billet to form a wafer, grinding and polishing said wafer to form a multianode stem.

2. The method of producing a multianode stem defined in claim 1 wherein the anode wire is Kovar.

3. The method of producing a multianode stem defined in claim 1 the glass cane and tubing in the interstitials is glass.

4. The method of producing a multianode stem defined in claim 1 wherein the anode wires are stacked in a 10 ×10 geometric pattern to form a 100-anode array.

* * * * *